United States Patent Office 2,779,101
Patented Jan. 29, 1957

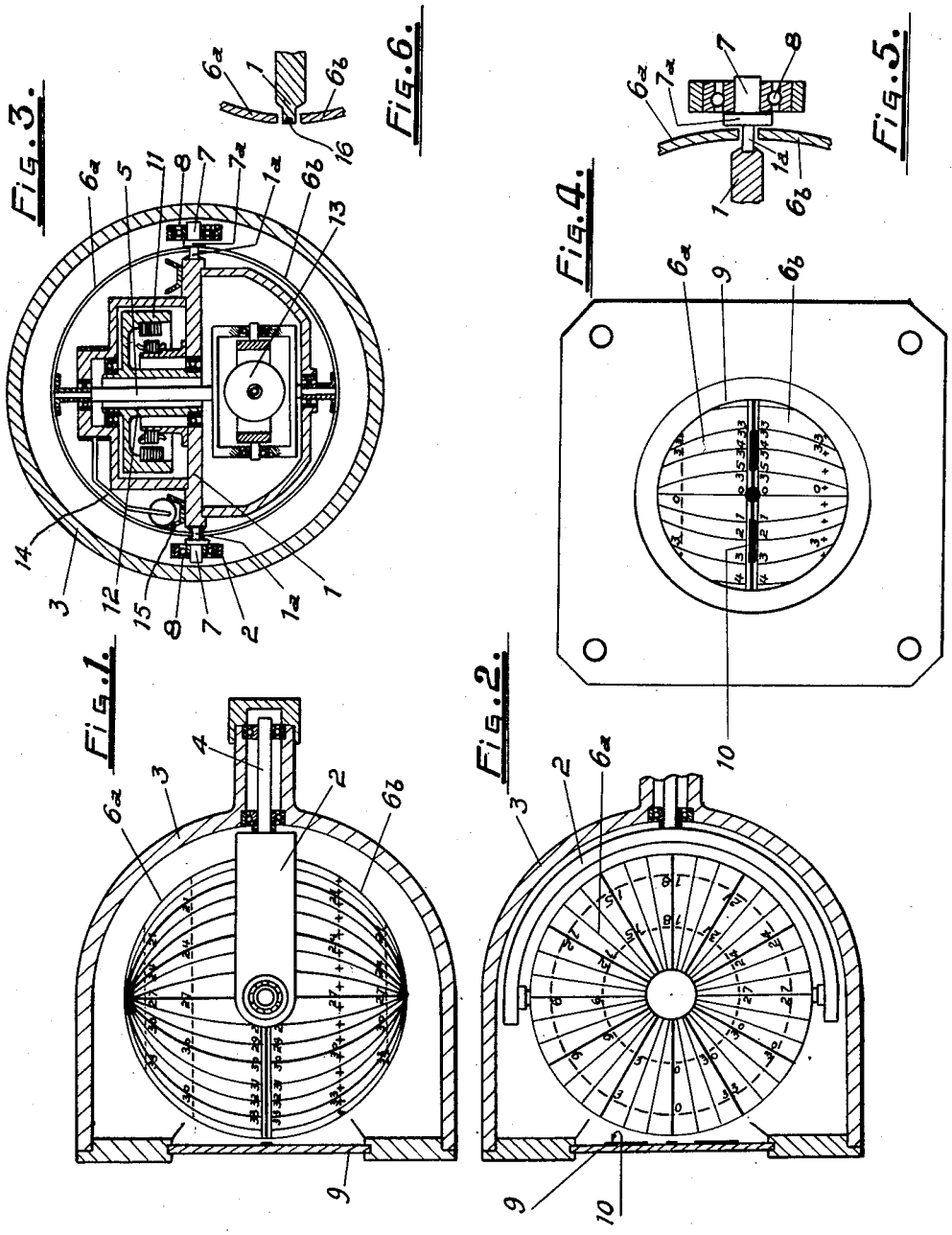

2,779,101

PANEL INSTRUMENT FOR INDICATING THE DIRECTION OF FLIGHT AND THE ATTITUDE OF AN AIRCRAFT

Pierre André Chombard, Paris, France, assignor to Etat Francais, represented by Monsieur l'Ingenieur General Rouanet, acting on behalf of the Secretary of State for Air, Paris, France Application January 9, 1953, Serial No. 330,395

5 Claims. (Cl. 33—204)

This invention relates to an improved instrument for navigation and controlling the flight of aircraft.

The conventional piloting instruments, namely gyroscopic horizons and directional gyroscopes, are insufficient for piloting jet aircraft which fly at large angles of inclination either when turning or when climbing or diving. In fact, the conventional gyroscopic horizon effects a perfect indication of pure rolling and pure pitching movements in level flight, but it is difficult to interpret the indications in the case of large angles of dive or zoom. In particular, it is found that yawing movement produce rolling movements of the horizon line of the dial.

With regard to the directional gyroscope, the indications thereof are only true in rectilinear horizontal flight. When the aircraft is inclined, either laterally during turning, or longitudinally, the indications contain an error due to the universal mounting.

On the other hand, the normal conception of the "heading," which is the fundamental element of navigation, needs to be revised in the case of aircraft whose trajectory approaches the vertical. It is then logical to use the term "heading" to mean the projection on to the horizontal plane of the angle formed by the air speed vector (speed of the aircraft in relation to the air) with the plane of the local meridian. For the sake of convenience, the air speed vector may be replaced without any appreciable error by a longitudinal axis connected to the aircraft.

Panel instruments are here proposed which are adapted to inform the pilot without ambiguity of the attitude of his aircraft, within certain limits of variation thereof, and to give an indication of the heading of his aircraft, in conformity with the definition given above.

Such instruments therefore replace both the gyroscopic horizon and the directional gyroscope of conventional form. They materialize before the view of the pilot a reference system, defined by a horizontal plane and the plane of the local meridian, and which may be defined by a trirectangular trihedron, called the local trihedron in aerial navigation.

The materializing of this reference system is generally obtained by centralizing in a single panel instrument the indications of heading and attitude (roll and pitching), delivered by distinct instruments, dispersed in the aircraft.

This arrangement has the drawback of dispersing the various elements. A complication results, since repetitive organs are necessary.

When the said instruments giving the heading and the attitude of the aircraft are grouped in a single panel instrument, the said panel instrument could heretofore only be worked within certain limits of the attitude.

The object of the present invention is a panel instrument wherein the above drawbacks are overcome by locating the instruments, the indications of which determine the position of the reference system, within the casing of the present panel instrument, and by extending its use to any possible attitude of the aircraft.

Another object of the invention is a panel instrument giving the heading without Cardan error.

For a better understanding of the invention and to show how the same may be carried into effect, reference will now be made to the accompanying drawings, in which:

Figure 1 is an elevational view of this instrument, the casing being cut away,

Figure 2 is the corresponding plan view, the casing again being cut away,

Figure 3 is a transverse section.

Figure 4 is a front view, and

Figures 5 and 6 show two details of the invention.

The horizontal plane OxOy of the local trihedron is materialised by a circular platform 1 having a generally circular rim portion 1a (see Figures 1, 2, 3 and 4) journalled in a fork or half Cardan ring 2 along a diameter. The fork is in turn journalled in the casing 3 of the instrument on a pin 4 perpendicular to the aforesaid axis. These two rotational movements take place without limitation. The platform 1 is horizontally stabilised by methods which will hereinafter be described.

Journalled in the centre of the platform 1 is a frame including a vertical pin portion 5 and having mounted on it two hemispheres 6a—6b, so that the whole has the appearance of a sphere having a slot at the equator. The said sphere is azimuthally stabilised about its vertical axis by means which will hereinafter be described.

The said sphere materialises the local trihedron, and may support on its external surface a network of meridians and parallels bearing numbered references.

An important element of the arrangement is the manner in which are secured to the platform I the pins 7 of the ball bearings 8 of the journals. The thin edge Ia of the platform is joined to the shoulders 7a of the pin in such manner that the edges of the two hemispheres are sufficiently close to give in every position the illusion of a continuous sphere Fig. 5. The said sphere is observed through a circular glazed aperture 9 situated in front of the instrument (Figure 4).

There is disposed at the centre of the window along the horizontal diameter thereof, a vignette 10 representing in conventional manner the wing span of the aircraft by a dash, a dot and a dash (the letter K of the Morse code).

The vignette 10 may, if desired, be displaced vertically, for an exact adjustment to predetermined conditions of flight.

At its forward part, the edge of the horizontal platform 1 closes, with very small clearance, the gap between the two hemispheres (Figure 5). The said platform bears the horizontal equatorial line 16 forming the horizon line.

The fictitious straight line joining the central point of the vignette to the centre of the sphere defines the longitudinal axis of the aircraft. At any instant, the pilot can read from the position of the central point of the vignette on the system of parallels the angle between the longitudinal axis of his aircraft and the horizontal plane, while he can read the angle of heading from the system of meridians. Finally, the angle between the vignette and the meridian passing through its centre is the angle between the wingspan of the aircraft and the vertical plane. The pilot is thus able to check the position of his aircraft laterally, which he can also do by using the parallels.

The design of the sphere and the colour thereof are such as to facilitate the interpretation. In Figures 1, 2 and 4 the upper parallels which will be seen during dives are indicated by minus signs, while the lower parallels which will be seen during zooms are indicated by plus signs.

It will now be convenient to describe the devices of stabilisation employed.

Situated in the upper hemisphere 6a is a gyroscope 11 having a hollow vertical pin or spindle 12 pivoted on the platform 1. This gyroscope 11 is controlled by an erecting system of the type conventionally employed in gyroscopic horizons, for example:

1. A ball erector 14 turning in a circular platform 15, as disclosed in the U. S. Patents Numbers 2,441,307 and 2,504,061,
2. Levels controlling to torque motors mounted on each of the axes of the platform.

Disposed in the lower hemisphere 6b is a conventional directional gyroscope 13, the vertical axis of the universal suspension of which consists of the vertical frame including pin portion 5 journalled in the platform and supporting both hemispheres 6a and 6b. The pin portion extends through the hollow pin 12 of the vertical gyroscope.

It is essential that this gyroscope 11 by which the platform 1 is maintained horizontal should have a considerable kinetic moment in view of the masses which it has to stabilise, the said moment being considerably greater than that of the directional gyroscope 13, so that it can withstand without exaggerated precession the control couples which it is necessary to exert thereon. It is known, in fact, that the said directional gyroscope must be monitored by means of suitable couples in elevation, in order to avoid undesirable positions, and in azimuth in order to indicate and maintain the heading, either manually or automatically by means of a magnetic compass. Any of the conventional methods may be employed for these functions.

The arrangements described satisfy the aforesaid condition regarding the relative values of the kinetic moments of the gyroscopes.

Contingently, these arrangements also permit the axis 12 of the vertical gyroscope 11 to be inclined in order to compensate for errors due to turns. It is sufficient to give the bore of the pin 12 of the vertical gyroscope 11 a suitable diameter.

These arrangements also permit the Cardan error to be cancelled.

It will then be possible to limit the rotations of the sphere about its transverse axis ± approximately 85° instead of complete freedom, in order to limit the disadvantages which may arise from coincidence of the axes of the universal suspension in the course of acrobatic flights such as looping.

It is also not impossible that the vertical gyroscope may be disposed in the lower hemisphere and the directional gyroscope in the upper hemisphere.

What I claim is:

1. A panel instrument for indicating the direction and the attitude of an aircraft comprising a casing having an opening, a half Cardan ring rotatably mounted in the casing, a platform mounted for rotation about one of its diameters in said ring, a vertical gyroscope mounted within said casing and having a hollow vertical spindle rotatably supported by said platform, said platform having a generally circular rim portion in a plane substantially perpendicular to said spindle, a vertical frame having a pin portion extending through said hollow vertical spindle, a directional gyroscope having its inner ring rotatably mounted on said frame with its center on the axis of the pin portion, a hemisphere secured to each end of said frame, said hemispheres having the outer faces of their free edge portions flush with the outer edge of the platform rim portion and having their free edges closely adjacent to said rim portion to impart the impression of a continuous sphere, and a reference system in the casing and visible through the casing opening, said hemispheres having a network of numbered meridians and parallels cooperating with said reference system various parts of which are brought selectively into view through said casing opening depending upon the direction of travel and the attitude of the aircraft.

2. A panel instrument for indicating the direction and the attitude of an aircraft comprising a casing having an opening, a half Cardan ring rotatably mounted in the casing, a platform mounted for rotation about one of its diameters in said ring, a vertical gyroscope mounted within said casing and having a hollow vertical spindle rotatably supported by said platform, said platform having a generally circular rim portion in a plane substantially perpendicular to said spindle, a vertical frame having a pin portion extending through said hollow vertical spindle, a directional gyroscope having its inner ring rotatably mounted on said frame with its center on the axis of the pin portion, a hemisphere secured to each end of said frame, said hemispheres having the outer faces of their free edge portions flush with the outer edge of the platform rim portion and having their free edges closely adjacent to said rim portion to impart the impression of a continuous sphere, and a reference system in the casing and visible through the casing opening, said hemispheres having a network of numbered meridians and parallels cooperating with said reference system various parts of which are brought selectively into view through said casing opening depending upon the direction of travel and the attitude of the aircraft, the outer edge of the platform rim portion bearing at its mean plane a continuous horizontal equatorial line constituting a horizon representation.

3. A panel instrument for indicating the direction and the attitude of an aircraft comprising a casing having an opening, a half Cardan ring rotatably mounted in the casing, a platform mounted for rotation about one of its diameters in said ring, a vertical gyroscope mounted within said casing and having a hollow vertical spindle rotatably supported by said platform, said platform having a generally circular rim portion in a plane substantially perpendicular to said spindle, a vertical frame having a pin portion extending through said hollow vertical spindle, a directional gyroscope having its inner ring rotatably mounted on said frame with its center on the axis of the pin portion, a hemisphere secured to each end of said frame, said hemispheres having the outer faces of their free edge portions flush with the outer edge of the platform rim portion and having their free edges closely adjacent to said rim portion to impart the impression of a continuous sphere, and a reference system in the casing and visible through the casing opening, said hemispheres having a network of numbered meridians and parallels cooperating with said reference system various parts of which are brought selectively into view through said casing opening depending upon the direction of travel and the attitude of the aircraft, said gyroscopes being mounted on opposite sides of the platform.

4. A panel instrument for indicating the direction and the attitude of an aircraft comprising a casing having an opening, a half Cardan ring rotatably mounted in the casing, a platform mounted for rotation about one of its diameters in said ring, a vertical gyroscope mounted within said casing and having a hollow vertical spindle rotatably supported by said platform, said platform having a generally circular rim portion in a plane substantially perpendicular to said spindle, a vertical frame having a pin portion extending through said hollow vertical spindle, a directional gyroscope having its inner ring rotatably mounted on said frame with its center on the axis of the pin portion, a hemisphere secured to each end of said frame, said hemispheres having the outer faces of their free edge portions flush with the outer edge of the platform rim portion and having their free edges closely adjacent to said rim portion to impart the impression of a continuous sphere, a reference system in the casing and visible through the casing opening, said hemispheres having a network of numbered meridians and parallels cooperating with said reference system various parts of which are brought selectively into view through said casing opening depending upon the direction of travel and the attitude of the aircraft, and ball erector means for stabilizing the hollow vertical spindle of the vertical gyroscope.

5. A panel instrument for indicating the direction and the attitude of an aircraft comprising a casing having an opening, a half Cardan ring rotatably mounted in the casing, a platform mounted for rotation about one of its diameters in said ring, a vertical gyroscope mounted within said casing and having a hollow vertical spindle rotatably supported by said platform, said platform having a generally circular rim portion in a plane substantially perpendicular to said spindle, a vertical frame having a pin portion extending through said hollow vertical spindle, a directional gyroscope having its inner ring rotatably mounted on said frame with its center on the axis of the pin portion, a hemisphere secured to each end of said frame, said hemispheres having the outer faces of their free edge portions flush with the outer edge of the platform rim portion and having their free edges closely adjacent to said rim portion to impart the impression of a continuous sphere, and a reference system in the casing and visible through the casing opening, said hemispheres having a network of numbered meridians and parallels cooperating with said reference system various parts of which are brought selectively into view through said casing opening depending upon the direction of travel and the attitude of the aircraft, means for rotatably mounting said platform in said half Cardan ring comprising a pin journalled in each free end of the half Cardan ring, the rim portion of said platform being of reduced thickness and secured to said pin, said reduced portions permitting said free edges of the hemispheres to more closely approach one another to enhance the impression of a continuous sphere.

References Cited in the file of this patent

UNITED STATES PATENTS

| | | |
|---|---|---|
| 2,001,038 | Reid | May 14, 1935 |
| 2,077,849 | Moller et al. | Apr. 20, 1937 |
| 2,134,932 | Smith | Nov. 1, 1938 |
| 2,292,732 | Anscott | Aug. 11, 1942 |
| 2,485,552 | Aumuller | Oct. 25, 1949 |
| 2,608,001 | Barkalow | Aug. 26, 1952 |
| 2,636,161 | Hoover | Apr. 21, 1953 |